US011370937B2

(12) United States Patent
Jana et al.

(10) Patent No.: US 11,370,937 B2
(45) Date of Patent: Jun. 28, 2022

(54) PROTECTIVE COATING COMPOSITION AND COATED METALLIC SUBSTRATE COMPRISING SAME

(71) Applicant: Momentive Performance Materials Inc., Waterford, NY (US)

(72) Inventors: Rajkumar Jana, Bangalore (IN); Raghavendra Prasad, Bangalore (IN); Karthikeyan Murugesan, Bangalore (IN)

(73) Assignee: MOMENTIVE PERFORMANCE MATERIALS INC., Waterford, NY (US)

( * ) Notice: Subject to any disclaimer, the term of this patent is extended or adjusted under 35 U.S.C. 154(b) by 472 days.

(21) Appl. No.: 16/291,551

(22) Filed: Mar. 4, 2019

(65) Prior Publication Data

US 2020/0283657 A1   Sep. 10, 2020

(51) Int. Cl.
| | | |
|---|---|---|
| *C09D 183/04* | (2006.01) | |
| *C09D 183/06* | (2006.01) | |
| *C09D 7/20* | (2018.01) | |
| *C09D 7/42* | (2018.01) | |
| *C09D 5/08* | (2006.01) | |
| *C08K 3/36* | (2006.01) | |
| *C08K 3/22* | (2006.01) | |

(52) U.S. Cl.
CPC ............. *C09D 183/06* (2013.01); *C09D 5/08* (2013.01); *C09D 7/20* (2018.01); *C09D 7/42* (2018.01); *C09D 183/04* (2013.01); *C08K 3/36* (2013.01); *C08K 2003/2227* (2013.01); *C08K 2003/2244* (2013.01)

(58) Field of Classification Search
CPC .............. C08K 2003/2227; C08K 2003/2244
USPC ......................... 106/287.1–287.16
See application file for complete search history.

(56) References Cited

U.S. PATENT DOCUMENTS

| | | | | |
|---|---|---|---|---|
| 4,513,123 A | * | 4/1985 | Day ........................ | C08J 5/10 |
| | | | | 525/332.6 |
| 7,612,137 B2 | * | 11/2009 | Brinkmann ............. | C09D 7/68 |
| | | | | 524/492 |
| 8,481,654 B2 | | 7/2013 | Edelmann | |
| 9,085,711 B1 | | 7/2015 | Khatri et al. | |
| 2004/0151915 A1 | | 8/2004 | Kitahara et al. | |
| 2005/0176885 A1 | | 8/2005 | Sekiba et al. | |
| 2006/0177672 A1 | * | 8/2006 | Kole .................... | C09D 183/04 |
| | | | | 428/447 |
| 2007/0068421 A1 | | 3/2007 | Im | |
| 2007/0128454 A1 | | 6/2007 | Im | |
| 2007/0190259 A1 | | 8/2007 | Bittner | |
| 2015/0118483 A1 | * | 4/2015 | Masuda ................. | C09D 7/62 |
| | | | | 252/589 |
| 2019/0031918 A1 | | 1/2019 | Jana et al. | |

FOREIGN PATENT DOCUMENTS

| | | | |
|---|---|---|---|
| CN | 101701336 | | 5/2010 |
| CN | 103804959 | | 5/2014 |
| CN | 1064535553 | | 2/2017 |
| JP | 2001-181572 | * | 7/2001 |
| JP | 2004307897 | | 11/2004 |
| KR | 20110101861 | | 9/2011 |
| WO | WO 2009/057935 A1 | * | 5/2009 |

OTHER PUBLICATIONS

Machine translation of JP 2001-181572 (no date).*
Syloid ED 30 Matting Agent product description (no date).*
Patent Cooperation Treaty (PCT), International Search Report and Written Opinion for Application PCT/US2020/020009 filed Feb. 27, 2020, dated May 26, 2020, International Searching Authority, EP.

* cited by examiner

*Primary Examiner* — Marc S Zimmer
(74) *Attorney, Agent, or Firm* — McDonald Hopkins LLC; James Abruzzo

(57) ABSTRACT

A surface-protective coating forming composition exhibiting excellent shelf life (storage stability) and cured coating performance is derived from alkoxysilane and a plurality of metal oxides.

31 Claims, No Drawings

PROTECTIVE COATING COMPOSITION AND COATED METALLIC SUBSTRATE COMPRISING SAME

FIELD OF THE INVENTION

This invention relates to surface-protective coating compositions, e.g., conversion and passivation coatings, and more particularly to curable coating compositions derived from alkoxysilanes, and to processes for coating substrates therewith.

BACKGROUND

Metal and alloys in exterior applications are often exposed to conditions that can corrode the surface through acid-base reactions and electrochemical corrosion, which can cause loss of mechanical strength and diminish the appearance of the finished metallic surfaces. Aluminum and aluminum alloys are the preferred materials for exterior applications due to the weight to strength ratio of such materials (light metal). Aluminum, however, is also a very soft metal that makes it prone to mechanical damage. For example, it may exhibit poor abrasion resistance, which leads to scratches. Aluminum is also susceptible to corrosion through exposure to acidic and basic conditions.

One approach to address these issues is to subject an aluminum material to an electrochemical process called anodization that deposits a uniform layer of aluminum oxide followed by sealing to close pores on the anodized surface. The anodized layer exhibits relatively better abrasion, corrosion and pH resistant (pH 4-9) compared to the non-anodized aluminum. However, the anodization process is a multistep, time consuming, and chemically intensive process. Also, anodization alone may not be sufficient for some demanding applications where stringent performances are desired such as resistance against highly acidic and basic conditions. In this case, for the protection of the anodized layer against these corrosive conditions, a protective coating layer is often applied that can provide resistance against extreme acidic and basic conditions and resistance against electrochemical corrosion by providing a barrier to the underneath layer in addition to good optical and abrasion resistance properties. Chromium and heavy metal phosphate conversion coatings have been used to prepare metal surfaces prior to painting. However, growing concerns regarding the toxicity of chromium and the polluting effects of chromates, phosphates, and other heavy metals discharged into streams, rivers and other waterways as industrial wastes have driven the quest for alternatives to such metal coating compositions.

One type of surface protective coating composition that has emerged from efforts to develop non-chromium, non-phosphate, and non-heavy metal based metal coating compositions is derived from alkoxysilanes. While curable coating compositions derived from alkoxysilanes continue to attract a high level of interest within the metals industry with some formulations having achieved wide-spread commercial acceptance, there remains considerable room for improvement in one or more of their properties that continue to be of major importance to metal fabricators and processors, e.g., the storage stability of the uncured compositions and the adhesion, flexibility, corrosion resistance, abrasion/wear resistance, and optical clarity properties of the cured compositions. It will be highly useful to have a single protective coating layer that can directly adhere to bulk/bare aluminum bypassing anodization and sealing processes while providing the protection to the aluminum substrate as similar to or better than anodized aluminum. The major advantage of this approach (coating directly on bulk/bare Al) is that it can provide options to avoid pre-treatment, anodization, and sealing steps. The key challenge associated with protective coatings for such substrates like aluminum bulk metal is strong adhesion while providing a barrier to acid, alkali, and corrosive mediums for better performance.

In addition to the performance requirements, some applications may call for the finished surface to have a matte appearance for styling purpose for eg. automotive trim parts. Currently a matte finish is achieved by a chemical etching process prior to anodization. The entire process of preparing a matte finish typically involves multistep cleaning, etching, anodization, and sealing processes. These processes are also time consuming, chemically intensive, and can be hazardous. In addition, a protective coating layer may be required in demanding applications to meet stringent performances such as resistance against highly acidic and basic conditions, and corrosion resistance, and anodization may not be sufficient alone.

SUMMARY

In accordance with one aspect of the invention, there is provided a curable surface-protective coating forming composition for application to protect the surface of a substrate such as one of metal, metal alloy, metallized part, metal or metallized part possessing one or more protective layers, metallized plastics, metal sputtered plastics, or primed plastic materials, the coating forming composition comprising:
(i) at least one alkoxysilane
(ii) a plurality of metal oxides in particulate and/or colloidal form chosen from one each of (a) alumina, (b) zirconia, and (c) a metal oxide chosen from silica, titania, zinc oxide, ceria, or a combination of two or more thereof, the amount of metal oxide being from about 1 to about 50 weight percent of the coating forming composition;
(iii) at least one water miscible organic solvent;
(iv) at least one acid hydrolysis catalyst;
(v) water;
(vi) optionally a matting agent; and
(vii) optionally, at least one condensation catalyst.

In one embodiment, the coating composition provides a clear coating when coated on a metal, metal alloy, metallized part, metal or metallized part possessing one or more protective layers, metallized plastics, metal sputtered plastics, or primed plastic materials.

In one embodiment, at least one alkoxy silane is selected from the group consisting of Formula A, Formula B, or a mixture of Formula A and Formula B:

$(X-R^1)_aSi(R^2)_b(OR^3)_{4-(a+b)}$  Formula A

$(R^3O)_3Si-R^5-Si(OR^3)_3$  Formula B or hydrolyzed and condensed products thereof,
wherein:
X is an organofunctional group;
each $R^1$ is independently a linear, branched or cyclic divalent organic group of from 1 to about 12 carbon atoms optionally containing one or more heteroatoms;
each $R^2$ independently is an alkyl, aryl, alkaryl or aralkyl group of from 1 to about 16 carbon atoms, optionally containing one or more halogen atoms;
each $R^3$ independently is an alkyl group of from 1 to about 12 carbon atoms;

$R^5$ is a linear, branched or cyclic divalent organic group of from 1 to about 12 carbon atoms optionally containing one or more heteroatoms; and subscript a is 0 or 1, subscript b is 0, 1 or 2 and a+b is 0, 1 or 2.

In one embodiment, wherein the total amount of alkoxysilane of Formulas A and B does not exceed about 80 weight percent of the coating forming composition.

In one embodiment, in the alkoxysilane of Formula A, a is 1 and organofunctional group X is a mercapto, acyloxy, glycidoxy, epoxy, epoxycyclohexyl, epoxycyclohexylethyl, hydroxy, episulfide, acrylate, methacrylate, ureido, thioureido, vinyl, allyl, —NHCOOR$^4$ or —NHCOSR$^4$ group in which R$^4$ is a monovalent hydrocarbyl group containing from 1 to about 12 carbon atoms thiocarbamate, dithiocarbamate, ether, thioether, disulfide, trisulfide, tetrasulfide, pentasulfide, hexasulfide, polysulfide, xanthate, trithiocarbonate, dithiocarbonate or isocyanurato group, or another —Si(OR$^3$) group wherein R$^3$ is as previously defined.

In one embodiment, in the alkoxysilane of formula B, R$^5$ is a divalent hydrocarbon group containing at least one heteroatom selected from the group consisting of O, S and NR$^6$ in which R$^6$ is hydrogen or an alkyl group of from 1 to about 4 carbon atoms.

In one embodiment, the trialkoxysilane of Formula A is at least one member selected from the group consisting of methyltrimethoxysilane, methyltriethoxysilane, ethyltrimethoxysilane, ethyltriethoxysilane, ethyltripropoxysilane, n-propyltrimethoxysilane, n-propyltriethoxysilane, n-propyltripropoxysilane, n-propyltributoxysilane, n-butyltrimethoxysilane, isobutyltrimethoxysilane, n-pentyltrimethoxysilane, n-hexyltrimethoxysilane, isooctyltriethoxysilane, vinyltrimethoxysilane, vinyltriethoxysilane, phenyltrimethoxysilane, phenyltriethoxysilane, octyltrimethoxysilane, trifluoropropyltrimethoxysilane, 3-aminopropyltrimethoxysilane, 3-mercaptopropyltrimethoxysilane, 3-mercaptopropyltriethoxysilane, 3-glycidoxypropyltrimethoxysilane and 3-glycidoxypropyltriethoxysilane, and wherein the trialkoxysilane of Formula B is at least one member selected from the group consisting of 1,2-bis(trimethoxysilyl)ethane, 1,2-bis(triethoxysilyl)ethane, bis(t-rimethoxysilylpropyl)disulfide, bis(triethoxysilylpropyl)disulfide, bis(trimethoxysilylpropyl)tetrasulfide, bis(triethoxysilylpropyl)tetrasulfide, bis(3-triethoxysilylpropyl)amine and bis(3-trimethoxysilylpropyl)amine.

In one embodiment, the total amount of metal oxide (a), (b), and (c) is from about 1 to about 50 weight percent based on the weight of the composition.

In one embodiment, the weight ratio of alumina to zirconia is from about 9:1 to about 1:9, about 3:1 to about 1:3, or from about 2:1 to about 1:2.

In one embodiment, the weight ratio of metal oxide (c) to the sum of the alumina and zirconia is from 99:1 to 1:99, about 95:5 to about 5:95; more preferably about 75:25 to about 25:75; still more preferably about 60:40 to about 40:60; still even more preferably from about 9:1 to about 1:9; even yet more preferably about 4:1 to about 1:4.

In one embodiment, the composition comprises the alumina in an amount of about 0.1 to about 20 weight percent based on the weight of the composition.

In one embodiment, the composition comprises the zirconia in an amount of about 0.1 to about 20 weight percent based on the weight of the composition.

In one embodiment, the composition comprises colloidal silica in an amount of about 1 to about 50 weight percent based on the weight of the composition.

In one embodiment, the composition comprises:
silica in an amount of from about 1 to about 50 wt. % based on the total weight of the composition; alumina in an amount of from about 0.1 to about 20 wt. % based on the total weight of the composition; and zirconia in an amount of from about 0.1 to about 20 wt. % based on the total weight of the composition;
silica in an amount of from about 5 to about 30 wt. % based on the total weight of the composition; alumina in an amount of from about 0.5 to about 10 wt. % based on the total weight of the composition; and zirconia in an amount of from about 0.5 to about 10 wt. % based on the total weight of the composition; or
silica in an amount of from about 10 to about 20 wt. % based on the total weight of the composition; alumina in an amount of from about 1 to about 5 wt. % based on the total weight of the composition; and zirconia in an amount of from about 1 to about 5 wt. % based on the total weight of the composition.

In one embodiment, the water-miscible solvent (iii) is at least one member selected from the group consisting of alcohol, glycol, glycol ether and ketone.

In one embodiment, the at least one acid hydrolysis catalyst (iv) is at least one member selected from the group consisting of sulfuric acid, hydrochloric acid, acetic acid, propanoic acid, 2-methyl propanoic acid, butanoic acid, pentanoic acid (valeric acid), hexanoic acid (caproic acid), 2-ethylhexanoic acid, heptanoic acid (enanthic acid), hexanoic acid, octanoic acid (caprylic acid), oleic acid, linoleic acid, cyclohexanecarboxylic acid, cyclohexylacetic acid, cyclohexenecarboxylic acid, benzoic acid, benzeneacetic acid, propanedioic acid (malonic acid), butanedioic acid (succinic acid), hexanedioic acid (adipic acid), 2-butenedioic acid (maleic acid), lauric acid, stearic acid, myristic acid, palmitic acid, isoanoic acid, versatic acid, and amino acid.

In another embodiment, the coating composition comprises the matting agent. The matting agent may be an inorganic compound or an organic compound. In one embodiment, the matting agent is chosen from a functionalized silica. In another embodiment, the matting agent is a silicone resin material.

In one embodiment, the matting agent is chosen from silicon dioxide, calcined calcium silicate, hydrated calcium silicate, aluminum silicate, magnesium silicate, titanium oxide, zinc oxide, aluminum oxide, barium oxide, zirconium oxide, strontium oxide, antimony oxide, tin oxide, antimony-doped tin oxide, calcium carbonate, talc, clay, calcined kaolin, calcium phosphate, a silicone resin, a fluororesin, an acrylic resin, or a mixture of two or more thereof.

In one embodiment, the matting agent is chosen from functionalized silica particles functionalized with a halosilane, an alkoxysilane, a silazane, a siloxane, or a combination of two or more thereof.

In one embodiment, the matting agent is present in an amount of from about 0.1 to about 10 weight percent based on the weight of the composition.

In one embodiment, the coating forming composition comprises also contains at least one condensation catalyst (vii) selected from the group consisting of tetrabutylammonium carboxylates of the formula $[(C_4H_9)_4N]^+[OC(O)—R^7]^-$ in which R$^7$ is selected from the group consisting of hydrogen, alkyl groups containing from 1 to about 8 carbon atoms, and aromatic groups containing about 6 to about 20 carbon atoms. In one embodiment, the condensation catalyst (vii) is at least one member selected from the group consisting of tetra-n-butylammonium acetate, tetra-n-butylammonium formate, tetra-n-butylammonium benzoate, tetra-n-butylammonium-2-ethylhexanoate, tetra-n-butylammonium-p-ethylbenzoate, tetra-n-butylammonium propionate and TBD-acetate (1,5,7-triazabicyclo[4.4.0]dec-5-ene (TBD)).

In one embodiment, the composition has a viscosity within the range of from about 3.0 to about 7.0 cStks at 25° C.

In another aspect, provided is an article comprising a coating formed from the coating forming composition of any previous embodiment disposed on a surface of the article.

In one embodiment, the surface coated comprising the coating forming composition is formed from a metal, metal alloy, painted metal or metal alloy, passivated metal or metal alloy, metallized plastic, metal sputtered plastic, or a primed plastic materials.

In one embodiment, the metal is selected from chrome, steel, stainless steel, carbon steel, aluminum, anodized aluminum, magnesium, copper, bronze, or an alloy of two or more of these metals, or metal oxides.

In still another aspect, provided is a method of forming a coating on a surface of an article comprising: applying the coating forming composition of any previous embodiment on a surface of the article; and curing the coating forming composition to form a coating.

In one embodiment, curing the coating forming composition comprises curing at a temperature of about 80 to about 200° C.

In yet another aspect, provided is a method of forming the coating forming composition according to any previous embodiment comprising:

a) reacting a mixture of alkoxysilane(s) (i) and a portion of acid hydrolysis catalyst (iv) to form a hydrolysate;

b) adding the plurality of metal oxides (ii) and water (v) to the hydrolysate of step (a);

c) adding water-miscible organic solvent (iii) and the remainder of acid hydrolysis catalyst (iv) to the mixture resulting from step (b);

d) aging the mixture resulting from step (c) to provide a curable coating forming composition having a viscosity at 25° C. within the range of from about 3.0 to about 7.0 cStks, more specifically from about 4.0 to about 5.5 cStks and still more specifically from about 4.5 to about 5.0 cStks; and, e) optionally, adding condensation catalyst (vii) and/or any other additional additives (e.g., UV absorber, pigments, colorants, slip additives, etc.) at, during or following any of the preceding steps.

In one embodiment, the method comprises adding the matting agent to the composition.

In yet another aspect of the invention, provided is a process for coating a metal with a surface-protective coating, i.e., a coating which imparts corrosion resistance and/or abrasion resistance to a surface of a non-coated or pre-coated metal, comprising: applying a coating according to any of the previous embodiments to a non-coated or pre-coated surface of a metal; removing at least some solvent (iii) from the applied coating of coating forming composition; and, curing the solvent-depleted coating of coating forming composition to provide a corrosion resistant and/or abrasion resistant coating on the metal surface.

The present curable coating forming compositions may possess excellent storage stability, and cured surface-protective coatings obtained from the coating compositions tend to exhibit one or more functionally advantageous properties such as high levels of corrosion and abrasion resistance, adherence to metal surfaces, flexibility (resistance to cracking or crazing) and acid and/or alkali resistance. In addition, the generally outstanding optical clarity of the cured coatings herein allows the aesthetically attractive quality of the underlying substrate surface to be shown to good effect.

DETAILED DESCRIPTION

In the specification and claims herein, the following terms and expression are to be understood as having the hereinafter indicated meanings.

The singular forms "a," "an," and "the" include the plural, and reference to a particular numerical value includes at least that particular value unless the context clearly dictates otherwise.

Other than in the working examples or where otherwise indicated, all numbers expressing amounts of materials, reaction conditions, time durations, quantified properties of materials, and so forth, stated in the specification and claims are to be understood as being modified in all instances by the term "about,"

All methods described herein may be performed in any suitable order unless otherwise indicated herein or otherwise clearly contradicted by context. The use of any and all examples or exemplary language (e.g., "such as") provided herein is intended merely to better illuminate the invention and does not pose a limitation on the scope of the invention unless otherwise claimed.

No language in the specification should be construed as indicating any non-claimed element as essential to the practice of the invention.

As used herein, the terms "comprising," "including," "containing," "characterized by," and grammatical equivalents thereof are inclusive or open-ended terms that do not exclude additional, unrecited elements, or method steps, but will also be understood to include the more restrictive terms "consisting of" and "consisting essentially of."

Composition percentages are given in weight percent unless otherwise indicated.

It will be understood that any numerical range recited herein includes all sub-ranges within that range and any combination of the various endpoints of such ranges or sub-ranges.

It will be further understood that any compound, material or substance that is expressly or implicitly disclosed in the specification and/or recited in a claim as belonging to a group of structurally, compositionally and/or functionally related compounds, materials or substances includes individual representatives of the group and all combinations thereof.

The expression "coating forming composition" refers to a composition, while not itself a practical or useful coating composition, following processing as described herein in detail forms a high quality and effective thermally curable surface-protective coating for application to a metal surface.

The term "metal" as used herein shall be understood herein to apply to metals per se, metal alloys, metalized parts, and metal or metalized parts possessing one or more non-metallic protective layers.

By "hydrolytically condensed" is meant that one or more silanes in the coating composition-forming mixture are first hydrolyzed followed by the condensation reaction of hydrolyzed product with itself or with other hydrolyzed and/or unhydrolyzed components of the mixture.

The coating compositions comprise: (i) at least one alkoxysilane; (ii) a plurality of metal oxides in particulate or colloidal form chosen from at least one each of (a) alumina, (b) zirconia, and (c) a metal oxide chosen from silica, titania, zinc oxide, ceria, or a combination of two or more thereof, the total amount of metal oxide being from about 1 to about 50 weight percent of the coating forming composition; (iii) at least one water miscible organic solvent; (iv) at least one acid hydrolysis catalyst; (v) water; and, (vi) optionally a matting agent; and (vii) optionally, at least one condensation catalyst. In one aspect, the base coating composition provides a composition for forming a clear coat on a metal surface. In another aspect, the base coating composition provides a composition for forming a matte coat on a metal surface.

A. Components of the Coating Forming Composition
Alkoxysilane (i)

In embodiments, the alkoxysilane (i) is selected from an alkoxysilane of Formula A and/or Formula B:

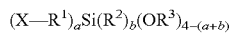  Formula A

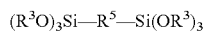  Formula B wherein:

X is an organofunctional group, more specifically a mercapto, acyloxy, glycidoxy, epoxy, epoxycyclohexyl, epoxycyclohexylethyl, hydroxy, episulfide, acrylate, methacrylate, ureido, thioureido, vinyl, allyl, —NHCOOR$^4$, or —NH-COSR$^4$ group in which R$^4$ is a monovalent hydrocarbyl group containing from 1 to about 12 carbon atoms, in embodiments from 1 to about 8 carbon atoms, thiocarbamate, dithiocarbamate, ether, thioether, disulfide, trisulfide, tetrasulfide, pentasulfide, hexasulfide, polysulfide, xanthate, trithiocarbonate, dithiocarbonate, or isocyanurato group, a fluoro group, or another —Si(OR$^3$) group wherein R$^3$ is as hereinafter defined;

each R$^1$ is a linear, branched, or cyclic divalent organic group of from 1 to about 12 carbon atoms, from 1 to about 10 carbon atoms, or from 1 to about 8 carbon atoms, e.g., a divalent hydrocarbon group such as the non-limiting examples of methylene, ethylene, propylene, isopropylene, butylene, isobutylene, cyclohexylene, arylene, aralkylene or alkarylene group, and optionally containing one or more heteroatoms such as the non-limiting examples of O, S, and NR$^6$ in which R$^6$ is hydrogen or an alkyl group of from 1 to 4 carbon atoms;

each R$^2$ independently is chosen from an alkyl, aryl, alkaryl, or aralkyl group of from 1 to about 16 carbon atoms, from 1 to about 12 carbon atoms, or from 1 to 4 carbon atoms, and optionally containing one or more halogen atoms, more specifically a fluorine atom;

each R$^3$ independently is an alkyl group of from 1 to about 12 carbon atoms, more specifically from 1 to about 8 carbon atoms, and still more specifically from 1 to 4 carbon atoms;

R$^5$ is a linear, branched or cyclic divalent organic group of from 1 to about 12 carbon atoms optionally containing one or more heteroatoms, from 1 to about 10 carbon atoms, or from 1 to about 8 carbon atoms, e.g., a divalent hydrocarbon group such as the non-limiting examples of methylene, ethylene, propylene, isopropylene, butylene, isobutylene, cyclohexylene, arylene, aralkylene or alkarylene group, and optionally containing one or more heteroatoms such as the non-limiting examples of O, S, and NR$^6$ in which R$^6$ is hydrogen or an alkyl group of from 1 to 4 carbon atoms; and subscript a is 0 or 1, subscript b is 0, 1 or 2 and a+b is 0, 1, or 2.

In one embodiment, the total amount of alkoxysilane of Formulas A and B does not exceed about 80 weight percent, about 70 weight percent, about 60 weight percent, 50 weight percent, about 45 weight percent, even about 40 weight percent of the coating forming composition. In one embodiment, the alkoxysilane (i) is present in the coating forming composition an amount of about 20 to about 80 weight percent; about 25 to about 70 weight percent, about 30 to about 50 weight percent, or about 35 to about 40 weight percent based on the weight of the composition.

In one embodiment, alkoxysilane (i) can be chosen from one or more of a dialkoxysilane, trialkoxysilane, and/or tetraalkoxysilane of Formula A, and/or one or more of a trialkoxysilane of Formula B as described above provided at least one such trialkoxysilane is included therein.

Examples of dialkoxysilanes of Formula A include, but are not limited to, dimethyldimethoxysilane, diethyldiethoxysilane, diethyldimethoxysilane, 3-cyanopropylphenyldimethoxysilane, diphenyldimethoxysilane, diphenyldiethoxysilane, di(p-tolyl)dimethoxysilane, bis(diethylamino)dimethoxysilane, bis(hexamethyleneamino)dimethoxysilane, bis(trimethylsilylmethyl)dimethoxysilane, vinylphenyldiethoxysilane, and the like, and their mixtures. As explained above the alkoxysilanes, including the dialkoxysilanes, also include hydrolysed and condensed products thereof (oligomers).

In one embodiment, at least one alkoxysilane (i) selected from the group consisting of Formulas A and/or B can be also hydrolyzed and condensed products thereof.

Such products oligomers of the alkoxysilane (i) are selected from the group consisting of Formulas A and B, and the like. They are prepared by hydrolysis and condensation of the alkoxysilanes (i) selected from the group consisting of Formulas A and B. That is, alkoxysilyl groups react with water, liberating the corresponding alcohol, and then the resulting hydroxysilyl groups condense with the formation of Si—O—Si (siloxane groups). The resulting hydrolysed and condensed products or oligomers can be for example linear or cyclic polysiloxanes comprising from 2 to 30 siloxy units, preferably from 2 to 10 siloxy units, and remaining alkoxy groups.

Specific exemplary examples of such oligomers include in particular oligomeric glycidoxypropyl-trimethoxysilane. Examples of trialkoxysilanes of Formula A include, but are not limited to methyltrimethoxysilane, methyltriethoxysilane, ethyltrimethoxysilane, ethyltriethoxysilane, ethyltripropoxysilane, n-propyltrimethoxysilane, n-propyltriethoxysilane, n-propyltripropoxysilane, n-propyltributoxysilane, n-butyltrimethoxysilane, isobutyltrimethoxysilane, n-pentyltrimethoxysilane, n-hexyltrimethoxysilane, isoocyltriethoxysilane, vinyltrimethoxysilane, vinyltriethoxysilane, phenyltrimethoxysilane, phenyltriethoxysilane, octyltrimethoxysilane, trifluoropropyltrimethoxysilane, 3-aminopropyltrimethoxysilane, 3-mercaptopropyltrimethoxysilane, 3-mercaptopropyltriethoxysilane, 3-glycidoxypropyltrimethoxysilane, 3-glycidoxypropyltriethoxysilane, oligomers and mixtures of two or more thereof. Of these, methyltrimethoxysilane, octyltrimethoxysilane, and glycidoxypropyltrimethoxysilane are exemplary trialkylsiloxanes. As explained above the alkoxysilanes, including the trialkoxysilanes, also include hydrolysed and condensed products thereof (oligomers).

Examples of tetraalkoxysilanes (i.e., tetraalkyl orthosilicates) of Formula A include, but are not limited to, tetramethoxysilane, dimethoxydiethoxysilane, tetraethoxysilane, methoxytriethoxysilane, tetrapropoxysilane, and the like, and mixtures of two or more thereof.

Examples of trialkoxysilanes of Formula B include, but are not limited to, 1,2-bis(trimethoxysilyl)ethane, 1,2-bis(triethoxysilyl)ethane, bis(trimethoxysilylpropyl)disulfide, bis(triethoxysilylpropyl)disulfide, bis(trimethoxysilylpropyl)tetrasulfide, bis(triethoxysilylpropyl)tetrasulfide, bis(3-triethoxysilylpropyl)amine, bis(3-trimethoxysilylpropyl) amine, and the like, and mixtures of two or more thereof.

Metal Oxides (ii)

The present compositions include metal oxide nanoparticles chosen from at least one each of (a) alumina, (b) zirconia, and (c) a metal oxide chosen from silica, titania, zinc oxide, ceria, or a combination of two or more thereof. The metal oxide components are generally provided in the form of particles or colloids. The shape of the particles is not particularly limited and the particles can be approximately spherical or equiaxial particles, rods, platelets, etc. The particles may have an average particle size of from about 5 nm to about 500 nm, from about 10 to about 200 nm, or from about 10 to about 60 nm. The average particle sizes may be determined by any suitable method or device including, for example, by Low Angle Laser Light Scattering (LALLS) using the full Mie theory, in particular, using Mastersizer 2000 or 3000, Malvern Instruments).

In one embodiment the metal oxides (ii) are provided as an aqueous colloidal dispersion thereof, for example, an aqueous colloidal dispersion of silica, alumina, and zirconia. Alternatively, metal oxides may be provided in powder form and may be dispersed within the coating composition.

Examples of suitable zirconia and alumina particle include, but are not limited to, Nyacol® AL27 (Nyacol), Nyacol® AL20 (Nyacol), Nyacol® AL20DW (Nyacol), Nyacol® Colloidal Zirconia ZrO2(OAC) acetate stabilized (Nyacol), Zr50/14 pH 3, Zr 100/20 etc. (Nyacol), Alumina dispersions in isopropanol & water (Sigma Aldrich).

In one embodiment, the metal oxide (c) is chosen from a silica. In one embodiment, the silica is provided as a colloidal silica. Aqueous dispersions of colloidal silica include those having an average particle size ranging from about 5 to about 150 nm, from about 20 to about 100 nm, or from about 40 to 80 nm. In one embodiment, the colloidal silica has an average particle size of from about 5 to about 30 nm. Suitable colloidal silica dispersions include commercially available ones such as, for example, Ludox® (Sigma Aldrich), Snowtex® (Nissan Chemical), and Bindzil® (AkzoNobel) and Nalco® Colloidal Silica (Nalco Chemical Company), Levasil® (AkzoNobel). Such dispersions are available in the form of acidic and basic hydrosols.

Both acidic and basic colloidal silica can be incorporated in the coating compositions. Colloidal silicas having a low alkali content may provide a more stable coating composition. Particularly suitable colloidal silicas, but are not limited to, include Nalco® 1034A (Nalco Chemical Company) and Snowtex® O40, Snowtex ST-033 and Snowtex® OL-40 (Nissan Chemical), Ludox® AS40 and Ludox® HS 40 (Sigma-Aldrich), Levasil 200/30 and Levasil® 200 S/30 (now Levasil CS30-516P) (AkzoNobel) and Cab-O-Sperse® A205 (Cabot Corporation).

The total amount of the metal oxide(s) (a), (b), and (c) for the metal oxide component (ii) incorporated in the coating forming composition, i.e., the total amount of alumina (a), zirconia (b), and metal oxide (c), may in general vary from about 1 to about 50, from about 10 to about 40, from about 10 to about 30, or from about 15 to about 20 weight percent based on the weight of the composition. In embodiments, the composition comprises:

metal oxide (c) in an amount of from about 1 to about 50 wt. % based on the total weight of the composition; from about 5 to about 30 wt. % based on the total weight of the composition; or from about 10 to about 20 wt. % based on the total weight of the composition;

alumina (a) in an amount of from about 0.1 to about 20 wt. % based on the total weight of the composition; from about 0.5 to about 10 wt. % based on the total weight of the composition; or from about 1 to about 5 wt. % based on the total weight of the composition; and zirconia (b) in an amount of from about 0.1 to about 20 wt. % based on the total weight of the composition; from about 0.5 to about 10 wt. % based on the total weight of the composition; or from about 1 to about 5 wt. % based on the total weight of the composition.

In the preceding description, the weights are given for the colloidal dispersion on the total weight of the composition as opposed to the total weight of the metal solids in the composition.

In one embodiment, the composition comprises silica as the metal oxide (c) and includes:

silica in an amount of from about 1 to about 50 wt. % based on the total weight of the composition; alumina in an amount of from about 0.1 to about 20 wt. % based on the total weight of the composition; and zirconia in an amount of from about 0.1 to about 20 wt. % based on the total weight of the composition;

silica in an amount of from about 5 to about 30 wt. % based on the total weight of the composition; alumina in an amount of from about 0.5 to about 10 wt. % based on the total weight of the composition; and zirconia in an amount of from about 0.5 to about 10 wt. % based on the total weight of the composition; or silica in an amount of from about 10 to about 20 wt. % based on the total weight of the composition; alumina in an amount of from about 1 to about 5 wt. % based on the total weight of the composition; and zirconia in an amount of from about 1 to about 5 wt. % based on the total weight of the composition.

The weights are given for the colloidal dispersion on the total weight of the composition as opposed to the total weight of the metal solids in the composition.

In one embodiment, the alumina and zirconia are provided in a ratio of alumina to zirconia of from about 9:1 to about 1:9; preferably about 3:1 to about 1:3; more preferably from about 2:1 to about 1:2. Using a mixture of alumina and zirconia provides for good adhesion to aluminum surface, very high abrasion resistance, good corrosion protection, heat resistance, and acid and alkali resistance. The ratio of metal oxide (c) to the alumina plus zirconia is from about 99:1 to about 1:99; preferably from about 95:5 to about 5:95; more preferably about 75:25 to about 25:75; still more preferably about 60:40 to about 40:60; still even more preferably from about 9:1 to about 1:9; yet even more preferably about 4:1 to about 1:4. The above ratios are based on actual solid metal oxides in the composition. In on embodiment, the metal oxide (c) is silica.

Water-Miscible Organic Solvent (iii)

Illustrative of water-miscible solvent(s) (iii) that may be incorporated in the coating forming composition are alcohols such as methanol, ethanol, propanol, isopropanol, n-butanol, tert-butanol, methoxypropanol, ethylene glycol, diethyleneglycol butyl ether, and combinations thereof. Other water-miscible organic solvents such as acetone, methyl ethyl ketone, ethylene glycol monopropyl ether and 2-butoxy ethanol can also be utilized. Typically, these solvents are used in combination with water, the latter together with any water associated with metal oxide (ii) and/or other component(s) of the coating composition providing part or all of water (v) thereof.

The total amount of water-miscible solvent(s) (iii) present in the coating forming composition can vary widely, e.g., from about 10 to about 80, from about 10 to about 65, from about 10 to about 60, or from about 10 to about 50, weight percent based on the total weight thereof.

Acid Hydrolysis Catalyst (iv)

Any of the acidic hydrolysis catalysts suitable for the hydrolysis of alkoxysilanes can be incorporated in the present coating forming compositions. Illustrative acid hydrolysis catalysts (iv) include, but are not limited to, sulfuric acid, hydrochloric acid, acetic acid, propanoic acid, 2-methyl propanoic acid, butanoic acid, pentanoic acid (valeric acid), hexanoic acid (caproic acid), 2-ethylhexanoic acid, heptanoic acid (enanthic acid), hexanoic acid, octanoic acid (caprylic acid), oleic acid, linoleic acid, linolenic acid, cyclohexanecarboxylic acid, cyclohexylacetic acid, cyclohexenecarboxylic acid, benzoic acid, benzeneacetic acid, propanedioic acid (malonic acid), butanedioic acid (succinic acid), hexanedioic acid (adipic acid), 2-butenedioic acid (maleic acid), lauric acid, stearic acid, myristic acid, palmitic acid, isoanoic acid, versatic acid, lauric acid, stearic acid, myristic acid, palmitic acid, isoanoic acid, aminoacids, and mixtures of two thereof. The acid hydrolysis catalyst can be used undiluted or in the form of an aqueous solution.

Acid hydrolysis catalyst (iv) will be present in the coating forming composition of the invention in at least a catalytically effective amount which in most cases can range from about 0.1 to about 5, from about 0.5 to about 4.5, or from about 2 to about 4 weight percent based on the total weight of coating forming composition.

Water (v)

The water component of the coating forming composition herein is advantageously deionized (DI) water. Some or even all of the total water present in the coating composition-forming mixture may be added as part of one or more other components of the mixture, e.g., aqueous colloidal dispersion of metal oxides (ii), water-miscible solvent (iii), acid hydrolysis catalyst (iv) optional condensation catalyst (vi) and/or other optional components (vii) such as those hereinafter described.

The total amount of water (v) can range within widely varying limits, e.g., from about 5 to about 40, more specifically from about 5 to about 30 and still more specifically from about 5 to about 15, weight percent based on the total weight of coating forming composition.

Matting Agent (vi)

In one embodiment, the coating composition includes a matting agent. In the absence of the matting agent, the composition provides a clear coat when applied to (and cured) on a metal surface. In compositions that include a matting agent, the resulting coating exhibits a matte finish.

The matting agent may be either a matting agent composed of an inorganic compound or a matting agent composed of an organic compound.

Examples inorganic compounds suitable as a matting agent include, but are not limited to, an inorganic compound include silicon-containing inorganic compounds (e.g., silicon dioxide, calcined calcium silicate, hydrated calcium silicate, aluminum silicate, magnesium silicate, etc.), titanium oxide, zinc oxide, aluminum oxide, barium oxide, zirconium oxide, strontium oxide, antimony oxide, tin oxide, antimony-doped tin oxide, calcium carbonate, talc, clay, calcined kaolin, calcium phosphate, etc. Particularly suitable are silicon-containing inorganic compounds. Particularly preferred is silicon dioxide since it can reduce the haze of cellulose acrylate films. As fine particles of silicon dioxide, for example, commercially available products under such trade names as Aerosil® R972, R974, R812, 200, 300, R202, OX50, and TT600 (manufactured by Nippon Aerosil Co., Ltd.) may be used.

In one embodiment, the matting agent is provided by functionalized silica particles. In one embodiment, the functionalized silica particles comprise an organic surface treated silica. The surface treatment may include treating the silica with a silanizing agent. Silanizing agents include halosilanes, alkoxysilanes, silazanes and/or siloxanes. Examples of treated silica particles suitable as the matting agent include, but are not limited to, described in U.S. Patent Publication US 2004/0120876, which is hereby incorporated by reference. Non-limiting examples of materials suitable for use as the matting agent include materials sold under the tradename SYLOID® from W.R. Grace, and/or ACEMATT® from Evonik.

Examples of organic compounds suitable as the matting agent include, but are not limited to, polymers such as silicone resins, fluororesins, acrylic resins, etc. Above all, more preferred are silicone resins. Of silicone resins, even more preferred are those having a three-dimensional network structure. An example of suitable organic compounds include those sold under the tradename TOSPEARL from Momentive Performance Materials including, but not limited to, TOSPEARL® 103, TOSPEARL® 105, TOSPEARL® 108, TOSPEARL® 120, TOSPEARL® 145, TOSPEARL® 3120 and TOSPEARL® 240, etc.

The matting agent, when included in the composition, may be present in an amount as desired for a particular purpose or intended application. In particular, the amount of matting agent may be chosen to provide a desired matting effect, e.g., a particular gloss, distinctness of image (DOI), etc. In one embodiment, the matting agent is provided in an amount of from about 0 to about 10 weight percent; from about 0.1 to about 10 weight percent; from about 0.2 to about 8 weight percent; or from about 0.5 to about 3 weight percent based on the weight of the composition. Further, it will be appreciated that the matting agent can include a mixture of two or more matting agents including mixtures of an inorganic compound type matting agent and an organic compound type matting agent.

Optional Condensation Catalyst (vii)

Optional condensation catalyst (vii) catalyzes the condensation of partially or completely hydrolyzed silane components (a) and (b) of the coating forming composition herein and thus functions as a cure catalyst.

While the coating forming composition can be cured in the absence of optional condensation catalyst (vii), efficient curing may require more intensive conditions, e.g., the application of elevated temperature (thermal curing) and/or extended cure times, both of which may be undesirable from a cost and/or productivity standpoint. In addition to providing for a more economical coating process, the use of optional condensation catalyst (vii) generally results in improved shelf life of the coating forming composition.

Examples of materials suitable as the condensation catalysts (vii) that may optionally be present in the coating forming composition include, but are not limited to, tetrabutylammonium carboxylates of the formula $[(C_4H_9)_4N]^+ [OC(O)-R^7]^-$ in which $R^7$ is selected from the group consisting of hydrogen, alkyl groups containing from 1 to about 8 carbon atoms, and aromatic groups containing about 6 to about 20 carbon atoms. In exemplary embodiments, $R^7$ is a group containing about 1 to 4 carbon atoms, such as methyl, ethyl, propyl, isopropyl, butyl or isobutyl. Compared to more active types of condensation catalysts (v), e.g., mineral acids and alkali metal hydroxides, the foregoing tetrabutylammonium carboxylates being somewhat milder in their catalytic action tend to optimize the shelf life of the coating forming compositions containing them.

Exemplary tetrabutylammonium carboxylate condensation catalysts of the foregoing formula are tetra-n-butylammonium acetate (TBAA), tetrabutylammonium formate, tetra-n-butylammonium benzoate, tetra-n-butylammonium-2-ethylhexanoate, tetra-n-butylammonium-p-ethylbenzoate, and tetra-n-butylammonium propionate. Particularly suitable condensation catalysts are tetrabutylammonium carboxylate, tetra-n-butylammonium acetate (TBAA), tetra-n-butylammonium formate, tetra-n-butylammonium benzoate, tetra-n-butylammonium-2-ethylhexanoate, tetra-n-butylammonium-p-ethylbenzoate, tetra-n-butylammonium propionate, tetramethylammonium acetate, tetramethylammonium benzoate, tetrahexylammonium acetate, dimethylanilium formate, dimethylammonium acetate, tetramethylammonium carboxylate, tetramethylammonium-2-ethylhexanoate, benzyltrimethylammonium acetate, tetraethylammonium acetate, tetraisopropylammonium acetate, triethanol-methylammonium acetate, diethanoldimethylammonium acetate, monoethanoltrimethylammonium acetate, ethyltriphenylphosphonium acetate, TBD acetate (1,5,7-Triazabicyclo[4.4.0]dec-5-ene (TBD)), as well as combinations of two or more thereof.

Of the foregoing tetrabutylammonium carboxylate condensation catalysts, tetra-n-butylammonium acetate, and tetra-n-butylammonium formate are particularly suitable materials.

Where utilized, condensation catalyst (vii) can be present in the coating forming composition in at least a catalytically effective amount, e.g., from about 0.0001 to about 1 weight percent based on the total weight thereof.

Other Optional Components (viii)

One or more other optional components (viii) are suitable for inclusion in the coating forming composition herein. Examples of other components include, but are not limited to, surfactants, antioxidants, dyes, fillers, plasticizers, UV absorbers, etc.

The coating forming composition can also include one or more surfactants functioning as leveling agents or flow additives. Examples of suitable surfactants include fluorinated surfactants such as Fluorad® (3M), silicone polyethers such as Silwet® and CoatOSil® (Momentive Performance Materials, Inc.), and silicone surface additives such as polyether-modified silicones, such as BYK-302 (BYK Chemie USA).

The coating composition can also include a UV absorber such as benzotriazole, benzophenones, or dibenzylresorcinol or their derivatives. Suitable UV absorbers include those capable of co-condensing with silanes, specific examples of which include 4-[gamma-(trimethoxysilyl) propoxyl]-2-hydroxy benzophenone, 4-[gamma-(triethoxysilyl) propoxyl]-2-hydroxy benzophenone and 4,6-dibenzoyl-2-(3-triethoxysilylpropyl) resorcinol. When UV absorbers that are capable of co-condensing with silanes are used, it is important that the UV absorber co-condenses with other reacting species by thoroughly mixing the thermally curable coating composition herein before applying it to the surface of a metal. Co-condensing the UV absorber prevents coating performance loss that may be caused by the leaching of free UV absorbers to the environment during weathering.

The coating forming composition can also include one or more antioxidants such as a hindered phenol (e.g. Irganox® 1010 (Ciba Specialty Chemicals), dyes & tinting agents such as methylene green, methylene blue, and the like), fillers such as, but not limited to, Titanium dioxide, zinc phosphate, barytes, aluminum flakes, etc., and/or a plasticizer such as, but not limited to, dibutylpthalate.

Pigments suitable for use herein generally include all inorganic and organic colors/pigments. These are usually aluminum, barium or calcium salts or lakes. A lake is a pigment that is extended or reduced with a solid diluent or an organic pigment that is prepared by the precipitation of a water-soluble dye on an adsorptive surface, which usually is aluminum hydrate. A lake also forms from precipitation of an insoluble salt from an acid or basic dye. Calcium and barium lakes are also used herein. Other colors and pigments can also be included in the compositions, such as pearls, titanium oxides, Red 6, Red 21, Blue 1, Orange 5, and Green 5 dyes, chalk, talc, iron oxides and titanated micas. The colors/pigments may also be in the form of pigment pastes/colorants.

B. Formation of the Coating Forming Composition.

In the formation of the thermally curable coating composition of the invention, reacting a mixture of alkoxysilane(s) (i) and a portion of the acid hydrolysis catalyst (iv), subsequent addition of the remaining portion of acid hydrolysis catalyst (iv) and aging of the resulting mixture under predetermined conditions of elevated temperature and time leads to a thermally curable composition having a range of viscosity of from about 3.0 to about 7.0 cStks, in another embodiment more specifically from about 4.0 to about 5.5 cStks and still in another embodiment more specifically from about 4.5 to about 5.0 cStks. In the present invention the viscosity can be measured, if required, at 25° C. in accordance with the DIN 53015 standard, "Viscometry—Measurement of Viscosity by Means of the Rolling Ball Viscometer by Hoeppler" employing a Hoeppler Falling Ball Viscometer Model 356-001 equipped with a Haake DC10 temperature control unit and ball set 800-0182, in particular, ball no. 2 having a diameter of 15.598 mm, a weight of 4.4282 g and a density of 2.229 g/cm$^3$.

Reacting the components can be done for example by using an ice bath, ice/NaCl mixture or dry ice/isopropanol mixture. More specifically the alkoxysilanes (i) and the acid hydrolysis catalyst (iv) are placed in a glass bottle and then placed in an ice bath to chill the mixture while monitoring temperature through an external thermometer.

In a first stage of the process of forming the thermally curable coating composition herein, a mixture of trialkoxysilane of Formulas A and/or B, optional dialkoxysilane and/or tetraalkoxysilane of Formula A and from about 10 to about 40 percent of the total amount of acid hydrolysis catalyst (iv) is mixed While in the chilled condition, metal oxide (ii), e.g., aqueous colloidal silica, is slowly added to the mixture.

Following the addition of metal oxide (ii) and with constant stirring the chilled mixture is allowed to rise in temperature to or about ambient, e.g., from about 20° C. to about 30° C. During this period of continuous stirring, the alkoxysilane component(s) (i) of the mixture undergo an initial level of hydrolysis followed by condensation of the resulting hydrolyzates.

In a second stage of the process for forming the thermally curable coating composition, water-miscible solvent(s) (iii) and the remaining acid hydrolysis catalyst (iv) are added to the now ambient temperature reaction medium and under continuous stirring over a period of, e.g., from about 5 to about 24, and more specifically from about 8 to about 15, hours during which further hydrolysis of silanes and/or partial hydrolyzates and condensation of the thus-formed hydrolyzates thereof takes place.

If utilized, optional condensation catalyst (vii) may be added in at least a catalytically effective amount at, during or following any of steps (a)-(d) of preparing the curable coating composition. The amounts of optional condensation catalyst (v) can vary widely, e.g., from about 0.01 to about 0.5, and more specifically from about 0.05 to about 0.2, weight percent based on the total weight of coating forming composition.

The optimum amount of residual silanol is obtained by accelerating the condensation reaction during aging as more fully described below. Once the desired viscosity level is obtained, the curable coating composition can be applied to a desired substrate to produce a uniform, transparent (or matte if formulated as such) and hard coating thereon.

Following this additional period of hydrolysis, optional condensation catalyst (vii) and one or more other optional components (viii) may be added to the reaction mixture, advantageously under continuous stirring for a further period of time, e.g., for from about 1 to about 24 hours. The resulting reaction mixture is now ready for aging.

Aging of the foregoing coating composition-forming mixture is carried out at elevated temperature over a period of time which has been experimentally determined to result in a viscosity within the aforestated range of from about 3.0 to about 7.0 cStks. Achieving such viscosity results in a curable coating composition with good-to-excellent cured coating properties. A lower viscosity may lead to reduced hardness of the coating film and to post curing that may occur on continued exposure of the coating. A higher viscosity may lead to cracking of the coating film during curing and subsequent exposure conditions.

For many coating composition-forming mixtures, a viscosity within the range of from about 3.0 to about 7.0 cStks can be achieved by heating the coating-forming mixture in an air oven, e.g., to a temperature of from about 25 to about 100° C. for from about 30 min. to about 1 day, at a temperature of from about 25 to about 75° C. for from about 30 min. to about 5 days, or at a temperature from about 25 to about 50° C. for from about 3 to about 10 days.

In another embodiment, the coating composition can be prepared by forming two separate mixtures of silane and (different) metal oxide nanoparticles and then combining the two mixtures to form the clear coat composition. In one embodiment, the coating composition is prepared by:
(a) (i) providing a first solution containing an acid catalyst and a first portion of desired silane;
(ii) cooling or chilling the mixture; and (iii) adding one or more types of nano-particles such as silica and zirconia; and water to the mixture of the silanes and the acid catalyst;
(b) (i) providing a second solution comprising a second portion of a desired alkoxy silane and the different other types of nanoparticles such as alumina and zirconia;
(c) (i) mixing the solution of (b) with the solution of (a), and (ii) adding additional acid catalyst, the condensation catalyst, and optionally other additives as desired.

The matting agent particles are added while stirring. If the matting particles start to settle out of solution (e.g., after an extended period of time between making the composition and using the composition), the matting agents can be re-dispersed easily by simple mixing, and the formulation can be used to prepare the coating. In one embodiment, the matting agent is added subsequent to formation of the clear coat composition. In another embodiment, the matting agent may be added at any stage of the formation of the coating composition.

C. Coating Application and Curing Procedures

The present coating forming composition, with or without the further addition of added solvent(s), will typically have a solids content of from about 10 to about 50, from about 15 to about 40, or from about 20 to about 30 weight percent.

The pH of the coating composition will often come within the range of from about 3 to about 7, and more specifically from about 4 to about 6.

The curable coating composition can be coated onto a metal substrate with or without the use of a primer. In embodiments, the coating composition is coated onto a metal substrate without a primer.

The coating composition can be applied to a variety of substrates. Examples of suitable substrates include metals, metal alloys, chrome, metal oxides, painted metals or metal alloys, passivated metal or metal alloys, metallized plastics, metal sputtered plastics, primed plastic materials, etc. Suitable metals include, but are not limited to chrome, steel, stainless steel, aluminum, anodized aluminum, magnesium, copper, bronze, alloys of each of these metals, and the like.

The coating forming composition can be applied to a metal surface or other substrate employing any conventional or otherwise known technique such as, but not limited to, spraying, brushing, flow coating, dip-coating, etc. The coating thicknesses of the as-applied (or wet) coating can vary over a fairly broad range, such as from about 10 to about 150, from about 20 to about 100, or from about 40 to about 80 microns. Wet coatings of such thicknesses will generally provide (dried) cured coatings having thicknesses ranging from about 1 to 30, from about 2 to about 20, or from about 5 to about 15 microns.

As the coating dries, solvent(s) (iii) and any other readily volatile material(s) will evaporate and the applied coating will become tack free to the touch in about 15 to about 30 minutes. The coating layer/film is then ready for curing via any conventional or otherwise known or later discovered thermal curing procedures. The operational requirements of thermal curing procedures are well known in the art. For example, thermally accelerated curing may be carried out within a temperature regime of from about 80 to about 200° C. over a period of from about 30 to about 90 minutes to provide a cured, hard protective coating that is either optically clear or exhibits a matte finish (based on the composition) on the substrate metal.

The cured coating obtained from the coating forming composition of the invention may be in direct contact with the metal surface, may serve as the sole coating therein, may be superimposed upon one or more other coatings, and/or may itself possess one or more other coatings superimposed thereon. The cured coating composition, in addition to imparting corrosion and/or abrasion resistance properties to its metal substrate may also function as an aesthetic coating in which case it will constitute the sole or outermost coating on the metal substrate.

As previously described, for matte finishes, the compositions can provide the desired finish for a particular application or intended use in terms of gloss, distinctness of image, or other suitable property to evaluate such finishes. Gloss can be evaluated using any suitable device and method to measure gloss. In one embodiment, gloss is measured using a BYK Micro-TRI-Gloss Meter.

The advantages of the coating forming composition of the invention over known alkoxy silane-based coating forming compositions include the exceptional storage stability, ease of its application to any of a variety of metal and metalized surfaces, and the dependably uniform properties of the cured coating.

As previously indicated, the cured coating composition of the invention exhibits outstanding properties including a high level of adhesion to its metal substrate, corrosion resistance, flexibility (resistance to cracking and crazing), abrasion/wear resistance, optical clarity.

EXAMPLES

Examples 1-12

Examples 1-12 illustrate the preparation of coating forming compositions in accordance with aspects and embodiments of the present compositions and their performance as cured coatings on aluminum panels of approximately 15 cm length, 10 cm width, and 1 mm thickness and on.

The starting components of the curable coating forming compositions of Examples 1-12 are listed in Table 1 below:

TABLE 1

Starting Materials

| Component | | Chemical Name | Source (Grade name) |
|---|---|---|---|
| Trialkoxysilane | 1a | Methyltrimethoxy silane (MTMS) | Momentive (A-163) |
| | 1b | Glycidoxypropyltrimethoxy silane | Momentive (A-187) |
| Catalyst | 2a | Acetic acid hydrolysis catalyst | Sigma Aldrich |
| | 2b | Tetrabutyl ammonium acetate (TBAA) condensation catalyst (40 wt % in Water) | Momentive |
| Metal oxide | 3a | Aqueous colloidal silica ($SiO_2$), 40 weight percent solids | W. R. Grace (LUDOX AS-40) |
| | 3b | Alumina ($Al_2O_3$) dispersion in Iso-propanol (20 wt %) | Sigma Aldrich |
| | 3c | Zirconia ($ZrO_2$) 20% dispersion in water | Nyacol Nano Technologies, Inc. $ZrO_2$—OAC (Acetate stabilized) |
| | 3d | $SiO_2$ dispersion (34 wt %) | Nalco (Nalco-1034A) |
| | 3e | Alumina ($Al_2O_3$) dispersion in water (20 wt %) | Nyacol (AL27) |
| | 3f | Alumina ($Al_2O_3$) dispersion in water (20 wt %) | Nyacol (AL20) |
| | 3g | Alumina ($Al_2O_3$) dispersion in water (20 wt %) | Nyacol (AL20DW) |
| | 3h | Alumina ($Al_2O_3$) dispersion in water (20 wt %) | Nyacol (AL25HP) |
| Deionized water | 4 | Deionized water | |
| Solvent | 5 | 2-propanol | Aldrich |
| | 6 | n-butanol | Aldrich |
| Silicone surface additive | 7 | BYK-302 flow additive (1% in 1-methoxy-2-propanol) | BYK Chemie |

Preparation of Coating Formulations

Examples 1-7

The coating solutions of Examples 1-7 were prepared by a method that involves reacting alkoxy silane with different nano particles separately. In this method, a glass bottle was charged with acetic acid and trialkoxy silane. After cooling down the reaction mixture in an ice bath approximately to 10° C., a mixture of silica nano particles and water were added drop wise to the chilled mixture of silanes and acetic acid while maintaining temperature approximately below 10° C. The mixture was then allowed to stir for approximately 16 hours while the solution temperature slowly rose to room temperature. In another glass bottle, a portion of alkoxy silane (preferably 1:1 weight percentage of silane and nano particle) and nano particles (alumina) were mixed together, and kept for stirring approximately 16 hours at room temperature. After this, both the solutions were mixed together at room temperature and kept for stirring for 1-2 hours. Then, alcohols and remaining acetic acid were added and stirred for approximately 12 hours following which TBAA catalyst and flow additive were added. After this, the formulations were aged approx. for approximately 5-6 days at 50° C. in hot air oven prior to coating on metal surface.

Employing the starting materials listed in Table 1 and the general preparative procedures described above, the curable coating forming compositions of Examples 1-16 were prepared from the indicated mixtures set forth in Tables 2 and 3 below. Compositions of comparative examples are set forth in Table 4. The comparative examples were prepared using a method similar to that of Examples 1-7.

TABLE 2

| Chemicals | Component | EX. 1 | EX. 2 | EX. 3 | EX. 4 | EX. 5 | EX. 6 | EX. 7 |
|---|---|---|---|---|---|---|---|---|
| Acetic acid | 2a | 0.86 | 0.86 | 0.84 | 0.86 | 0.86 | 0.86 | 0.86 |
| MTMS | 1a | 23.68 | 35.1 | 35.08 | 35.1 | 23.68 | 35.1 | 23.68 |
| A-187 | 1b | 11.87 | 0 | 0 | 0 | 11.87 | 0 | 11.87 |
| $SiO_2$ dispersion | 3a | 12.02 | 12.02 | 12.7 | 12.02 | 12.02 | 12.02 | 12.02 |
| DI water | 4 | 12.27 | 12.27 | 13.45 | 11.406 | 11.406 | 10.89 | 10.89 |
| $ZrO_2$ dispersion | 3c | 2.13 | 2.13 | 1.41 | 3.21 | 3.21 | 3.852 | 3.852 |
| $Al_2O_3$ dispersion | 3b | 2.15 | 2.15 | 1.41 | 1.07 | 1.07 | 0.428 | 0.428 |
| 2-propanol | 5 | 14.97 | 14.97 | 14.37 | 15.834 | 15.834 | 16.35 | 16.35 |
| n-Butanol | 6 | 16.45 | 16.45 | 16.42 | 16.45 | 16.45 | 16.45 | 16.45 |
| Acetic acid | 2a | 1.89 | 1.89 | 1.89 | 1.89 | 1.89 | 1.89 | 1.89 |

TABLE 2-continued

| Chemicals | Component | EX. 1 | EX. 2 | EX. 3 | EX. 4 | EX. 5 | EX. 6 | EX. 7 |
|---|---|---|---|---|---|---|---|---|
| 1% BYK 302 | 7 | 1.84 | 1.84 | 1.82 | 1.84 | 1.84 | 1.84 | 1.84 |
| TBAA | 2b | 0.104 | 0.104 | 0.104 | 0.104 | 0.104 | 0.104 | 0.104 |
| Total | | 100.234 | 99.784 | 99.494 | 99.784 | 100.234 | 99.784 | 100.234 |

TABLE 3

| Chemicals | Component | EX. 8 | EX. 9 | EX. 10 | EX. 11 | EX. 12 | EX. 13 | EX. 14 | EX. 15 | EX. 16 |
|---|---|---|---|---|---|---|---|---|---|---|
| Acetic acid | 2a | 0.86 | 0.86 | 0.86 | 0.86 | 0.86 | 0.86 | 0.86 | 0.86 | 0.86 |
| MTMS | 1a | 35.10 | 35.10 | 35.10 | 31.00 | 31.00 | 35.1 | 35.1 | 35.1 | 35.1 |
| $SiO_2$ dispersion | 3d (Nalco1034A) | 14.20 | 23.00 | 0.00 | 0.00 | 0.00 | 0 | 0 | 0 | 0 |
| $SiO_2$ dispersion | 3a (Ludox AS-40) | 0.00 | 0.00 | 12.02 | 12.60 | 12.70 | 12.04 | 12.04 | 12.04 | 12.04 |
| DI water | 4 | 10.15 | 4.41 | 12.27 | 12.27 | 12.27 | 10.55 | 10.55 | 10.55 | 10.55 |
| $ZrO_2$ dispersion | 3c | 2.13 | 2.45 | 2.13 | 2.00 | 2.60 | 2.13 | 2.13 | 2.13 | 2.13 |
| $Al_2O_3$ dispersion | 3b | 2.15 | 2.45 | 2.13 | 2.00 | 2.60 | | | | |
| | 3e | | | | | | 2.26 | 0 | 0 | 0 |
| | 3f | | | | | | 0 | 2.26 | 0 | 0 |
| | 3g | | | | | | 0 | 0 | 2.26 | 0 |
| | 3h | | | | | | 0 | 0 | 0 | 2.26 |
| 2-Propanol | 5 | 14.97 | 19.97 | 14.97 | 14.97 | 14.97 | 16.69 | 16.69 | 16.69 | 16.69 |
| n-Butanol | 6 | 16.45 | 21.46 | 16.45 | 16.45 | 16.45 | 16.45 | 16.45 | 16.45 | 16.45 |
| Acetic acid | 2a | 4.55 | 5.13 | 4.84 | 5.00 | 5 | 1.88 | 1.88 | 1.88 | 1.88 |
| 1% BYK 302 | 7 | 1.84 | 1.84 | 1.84 | 1.84 | 1.84 | 1.84 | 1.84 | 1.84 | 1.84 |
| TBAA | 2b | 0.10 | 0.10 | 0.10 | 0.10 | 0.10 | 0.104 | 0.104 | 0.104 | 0.104 |
| Total | | 102.50 | 116.77 | 102.71 | 99.09 | 100.39 | 99.90 | 99.90 | 99.904 | 99.90 |

TABLE 4

| Ingredients | Component | Comparative example- Composition with only $SiO_2$ | Comparative example-2 Composition with $SiO_2$ and $Al_2O_3$ |
|---|---|---|---|
| Acetic Acid | 2a | 0.84 | 0.85 |
| MTMS | 1a | 35.44 | 35.1 |
| $SiO_2$ dispersion | 3a | 14.6 | 12.99 |
| $Al_2O_3$ dispersion | 3b | 0 | 2.27 |
| $ZrO_2$ dispersion | 3c | 0 | 0 |
| DI Water | 4 | 12.6 | 13.29 |
| 2-propanol | 5 | 16.63 | 14.85 |
| n-Butanol | 6 | 16.42 | 16.44 |
| Acetic Acid | 2a | 1.89 | 1.9 |
| BYK 302 (1% in MP) | 7 | 1.82 | 1.82 |
| TBAA | 2b | 0.104 | 0.104 |
| Total | | 100.34 | 99.61 |

Examples 8-12

A glass bottle was charged with acetic acid and trialkoxy silane. After cooling down the reaction mixture in an ice bath to approximately 10° C., a mixture of silica nano particles and water were drop wise added to the chilled mixture of silanes and acetic acid while maintaining the temperature below 10° C. Zirconia sol was added dropwise after the addition of silica sol. The mixture was stirred for 12-14 hours and then solvents were added to the mixture. The pH was adjusted to 6.5 and the alumina sol was added dropwise. After 60-90 min of stirring at room temperature, the pH was adjusted back to 5.1 using acetic acid. After 2 hours, TBAA catalyst and flow additive were added. After this, the formulations were aged at 50° C. in a hot air oven prior to coating on metal surface.

Examples 13-16

The coating solutions of Examples 13-16 were prepared by a method as described below. A glass bottle was charged with acetic acid and trialkoxy silane. After cooling down the reaction mixture in an ice bath to about 10° C., the corresponding Alumina sol was added dropwise to the chilled mixture. The mixture was allowed to be stirred for 2 hours. A mixture of Silica sol and water was added dropwise to the mixture while maintaining the temperature between 5-20° C. After stirring for 4 hours, Zirconia sol was added and the mixture was allowed to be stirred for 14-16 hrs. while the mixture warmed to room temperature. 2-Propanol and 1-Butanol were added to the mixture followed by the addition of second portion of Acetic acid. After stirring for several hours, the flow additive and the catalysts solutions were added to the mixture. The formulation was aged at 50° C. for several days prior to coating on metal surfaces.

The general procedures for applying the curable coating forming compositions of Examples 1-16 to the bulk/bare aluminum panels and curing the coatings thereon were as follows:

Coating Procedure

The metal substrate is first cleaned with isopropanol and dried in air. Application of a coating layer having an approximate thickness of about 10 microns may be carried out by any suitable means, e.g., by dip, flow or spray coating. Flow coating was used for applying an approximately 10 micron thick layer of coating forming composition to the bulk aluminum panels.

Curing Procedure

After applying coatings to the bulk aluminum substrates, volatiles were evaporated at about 20-25° C. resulting in the formation of tack-free coating layers within about 25-30 minutes. The coated panels were then baked in a hot air oven at 130-200° C. for 30-60 minutes to produce a completely cured, clear hard coat on the metal surfaces.

Testing of the coated metal panels was carried out as described below in Table 5:

TABLE 5

Testing of Coated Panels

| Test | Procedure |
|---|---|
| Coating Appearance (Applicable for Clearcoat) | Appearance of the coating was evaluated by visual inspection. To pass the appearance test, a coating had to be smooth, glossy, optically clear and free of other visible defects. |
| Coating Appearance (Applicable for Matte Coating) | Appearance of the coating was evaluated by visual inspection. To pass the appearance test, a coating had to be smooth, matte appearance, clear and free of other visible defects. |
| Adhesion of Coating to Panel | The adhesion test was carried out in accordance with ASTM D 3359 (5B considered as best adhesion, 0B considered as no adhesion) |
| Crockmeter Abrasion Resistance of Coating | This test is done by AATCC Crockmeter CM-5 instrument using green crocking cloths 5 cm × 5 cm (from Atlas) for 10 cycles (1 cycle = rubbing forth and back); distance: 100 mm; force: 9N (automatically applied). To pass this test, there should not be any visible scratches on the surface after the test. |
| Heat Resistance | The coated panels were maintained in a hot air oven at 160° C. for 24 hours. To pass this test, there could be no observable adhesion loss, delamination or cracking. |
| Acid Resistance of Coating | The coated panels were dipped into a pH 1.0 HCl solution for 10 minutes. The panels were then removed from the solution, washed with DI water and dried at ambient temperature (approximately 23° C.). To pass this test, there could be no softening of the coating film, adhesion loss, delamination, cracking, corrosion or any other visible defects. |
| Alkali Resistance of Coating | The coated panels were dipped into a pH 13.5 phosphate buffer solution for 10 minutes. The panels were then removed from the buffer solution, washed with DI water and dried at ambient temperature (approximately 23° C.). To pass this test, there could be no softening of the coating film, adhesion loss, delamination, cracking, corrosion or any other visible defects. |
| Humidity Resistance | This test was carried out per DIN EN ISO 6270-2-CH. To be acceptable, the coating had to pass 240 hours according to this test. |
| Copper Accelerated Salt Spray Resistance (CASS) Test | This test was carried out per DIN EN ISO 9227. To be acceptable, the coating had to pass 8 hours according to this test. |
| Neutral Salt Spray Resistance (NSS) Test | This test was carried out per DIN EN ISO 9227. To be acceptable, a coating had to pass 480 hours according to this test. |

Coating performance data are presented in Tables 6-9 as follows:

TABLE 6

Adhesion and Visual Appearance Test Results for EX. 1-7

| | EX. 1 | EX. 2 | EX. 3 | EX. 4 | EX. 5 | EX. 6 | EX. 7 |
|---|---|---|---|---|---|---|---|
| Initial Adhesion | 5B | 5B | 5B | 5B | 5B | 5B | 5B |
| Visual Appearance | Clear, No orange peel | Clear, No orange peel | Clear, No orange peel | Clear, No orange peel | Delamination at edges | Clear, No orange peel | Delamination at edges |

TABLE 7

| | Ex. 1 | Ex. 2 |
|---|---|---|
| Visual Appearance | Smooth, Clear and Glossy, No defects | Smooth, Clear and Glossy, No defects |
| Initial Adhesion | 5B | 5B |
| Crockmeter Abrasion Resistance test | Passes | Passes |
| Heat Resistance test | Passes | Passes |
| Acid resistance test | Passes | Passes |
| Alkaline resistance test | Passes | Passes |
| Neutral Salt Spray test | Passes | Passes |
| CASS test | Passes | Passes |

TABLE 8

Coating Performance for EX. 8-Ex. 12

| | EX. 8 | EX. 9 | EX. 10 | EX. 11 | EX. 12 | EX. 13 | EX. 14 | EX. 15 | EX. 16 |
|---|---|---|---|---|---|---|---|---|---|
| Coating Appearance | Smooth, Clear and Glossy, No defects | Smooth, Clear and Glossy, No defects | Smooth, Clear and Glossy, No defects | Smooth, Clear and Glossy, No defects | Smooth, Clear and Glossy, No defects | Smooth, Clear and Glossy, No defects | Smooth, Clear and Glossy, No defects | Smooth, Clear and Glossy, No defects | Smooth, Clear and Glossy, No defects |
| Initial Adhesion | 5B | 5B | 5B | 5B | 5B | 5B | 5B | 5B | 0B |
| Crockmeter Abrasion Resistance test | Passes | Passes | Passes | Passes | Passes | Passes | Passes | Passes | Passes |
| Heat Resistance test | Passes | Passes | Passes | Passes | Passes | Passes | Passes | Passes | Passes |
| Acid resistance test | Passes | Passes | Passes | Passes | Passes | Passes | Passes | Passes | Passes |
| Alkaline resistance test | Passes | Passes | Passes | Passes | Passes | Passes | Passes | Passes | Passes |
| CASS Test | Not measured | Not measured | Not measured | Not measured | Passes | Passes | Passes | Passes | Not measured |

TABLE 9

Test Results for Comparative Examples

| | Comparative Example-1 Composition with only SiO$_2$ | Comparative Example-2 Composition SiO$_2$ and Al$_2$O$_3$ |
|---|---|---|
| Visual Appearance | OK | Not Good, Delamination |
| Crosshatch Adhesion bulk Al | 0B | 0B |

Matte Coating Compositions and Coatings

Starting Materials

The starting materials for matte coating compositions are listed in Table 10.

TABLE 10

| Component | | Chemical Name | Source (Grade name) |
|---|---|---|---|
| Trialkoxysilane | 1a | Methyltrimethoxy silane (MTMS) | Momentive (A-1630) |
| | 1b | Glycidoxypropyltimethoxy silane | Momentive (A-187) |
| Catalyst | 2a | Acetic acid hydrolysis catalyst | Sigma Aldrich |
| | 2b | Tetrabutyl ammonium acetate (TBAA) condensation catalyst (40 wt % in Water) | Momentive Performance Materials |
| Metal oxide | 3a | Aqueous colloidal silica (SiO$_2$), 40 weight percent solids | W. R. Grace (LUDOX AS-40) |
| | 3b | Alumina (Al$_2$O$_3$) dispersion in Iso-propanol (20 wt %) | Sigma Aldrich |
| | 3c | Zirconia (ZrO$_2$) 20% dispersion in water | Nyacol Nano Technologies, Inc. ZrO$_2$—OAC (Acetate stabilized) |
| | 3d | SiO$_2$ dispersion (34 wt %) | Nalco (Nalco-1034A) |
| Deionized water | 4 | Deionized water | |
| Solvent | 5 | 2-propanol | Aldrich |
| | 6 | n-butanol | Aldrich |
| Silicone surface additive | 7 | BYK-302 flow additive (1% in 1-methoxy-2-propanol) | BYK Chemie |
| Matting Agent | 8a | Syloid C-803 | W. R. Grace |
| | 8b | Syloid ED-2 | W. R. Grace |
| | 8c | TOSPEARL 120 | Momentive Performance Materials |

TABLE 10-continued

| Component | | Chemical Name | Source (Grade name) |
|---|---|---|---|
| | 8d | TOSPEARL 145 | Momentive Performance Materials |
| | 8e | ACEMATTE 3300 | Evonik |

The procedure of preparing the final matte coating forming compositions comprises two steps. The first step is to prepare the corresponding clear coat forming composition as previously described followed by the second step that involves dispersing matting agent to the clear coat forming composition.

Dispersion of Matting Agent

The clear coating compositions were obtained from the procedures described above with respect to the previous examples (Examples 17 & 18 were prepared as per the procedure for Example 2; and Examples 19 & 20 were prepared as per the procedure for Example 10). The clear coat compositions were taken in a round bottom flask and the required amount of functionalized silica based matting agent particles was added while stirring at approximately 800 RPM for 5-24 hours at room temperature. The mixture obtained was then centrifuged at 500-750 RPM for 3-5 minutes prior to the coating application (to separate the bigger particles from the formulation to avoid coating defects).

General Procedure for Coating with Matte Coating Compositions

Prior to coating applications, an aluminum surface was cleaned with isopropanol and dried in air. Application of thin layer coating of approximate thickness around 10 microns can be achieved by dip/flow/spray coating. After coating on aluminum substrates, volatiles evaporate at ambient condition (approx. 20-25° C., 30±10% RH) and a tack free coating layer is formed within 25-30 minutes. After solvent flash off the coated panels were baked in a hot air oven between 130-200° C. for 30-60 minutes to obtain completely cured, matte coat on aluminum surface.

Matte Coating Compositions (Examples 17-20)

Matte coating compositions were prepared as described above. The compositions are listed in Table 11:

TABLE 11

| Chemicals | Component | EX. 17 | EX. 18 | EX. 19 | EX. 20 |
|---|---|---|---|---|---|
| | | 0.85 | 0.85 | 0.83 | 0.83 |
| MTMS | 1a | 34.86 | 34.86 | 33.86 | 33.86 |
| SiO$_2$ dispersion | 3a | 11.94 | 11.94 | 12.02 | 12.02 |
| DI water | 4 | 12.18 | 12.18 | 11.60 | 11.60 |
| ZrO$_2$ dispersion | 3c | 2.12 | 2.12 | 2.06 | 2.06 |
| Al$_2$O$_3$ dispersion | 3b | 2.14 | 2.14 | 2.06 | 2.06 |
| 2-propanol | 5 | 14.87 | 14.87 | 14.45 | 14.45 |
| n-Butanol | 6 | 16.34 | 16.34 | 15.87 | 15.87 |
| Acetic acid | 2a | 1.88 | 1.88 | 4.84 | 4.84 |
| 1% BYK 302 | 7 | 1.83 | 1.83 | 1.84 | 1.84 |
| TBAA | 2b | 0.10 | 0.10 | 0.10 | 0.10 |
| SYLOID C 803 | 8a | 0.89 | 0 | 0.89 | 0 |
| SYLOID ED 2 | 8b | 0 | 0.89 | 0 | 0.89 |

Test results for the matte coating compositions are shown in Table 12:

TABLE 12

| Test Results | Ex. 17 | Ex. 18 | Ex. 19 | Ex. 20 |
|---|---|---|---|---|
| Coating Appearance | Passes | Passes | Passes | Passes |
| Gloss Values (20°) | 165-170 | 165-170 | 165-170 | 170-180 |
| Gloss Values (60°) | 180-200 | 200-210 | 210-220 | 190-200 |
| Gloss Values (85°) | 80-90 | 85-95 | 100-110 | 75-95 |
| Initial Adhesion | 5B | 5B | 5B | 5B |
| Crockmeter Abrasion Resistance test | Passes | Fail | Passes | Fail |
| Heat Resistance test | Passes | Passes | Fail | Fail |
| Alkaline resistance test | Passes | Passes | Fail | Fail |
| Water Soak Test | Passes | Passes | Fail | Fail |

Comparative Examples

Comparative examples were prepared with the formulations listed in Table 13:

TABLE 13

| | | Two Pot Method | | | One-pot method |
|---|---|---|---|---|---|
| Chemicals | Component | CE-3 | CE-4 | CE-5 | CE-6 |
| Acetic acid | 2a | 0.85 | 0.85 | 0.86 | 0.86 |
| MTMS | 1a | 34.86 | 34.86 | 35.1 | 35.10 |
| SiO$_2$ dispersion | 3a | 11.94 | 11.94 | 12.02 | 12.02 |
| DI water | 4 | 12.18 | 12.18 | 12.27 | 12.27 |
| ZrO$_2$ dispersion | 3c | 2.12 | 2.12 | 2.13 | 2.13 |
| Al$_2$O$_3$ dispersion | 3b | 2.14 | 2.14 | 2.15 | 2.13 |
| 2-propanol | 5 | 14.87 | 14.87 | 14.97 | 14.97 |
| n-Butanol | 6 | 16.34 | 16.34 | 16.45 | 16.45 |
| Acetic acid | 2a | 1.88 | 1.88 | 1.89 | 4.84 |
| 1% BYK 302 | 7 | 1.83 | 1.83 | 1.84 | 1.84 |
| TBAA | 2b | 0.10 | 0.10 | 0.104 | 0.10 |
| TOSPEARL 145 | 8d | 0.89 | 0 | 0 | 0 |
| ACEMATT 3300 | 8e | 0 | 0.89 | 0 | 0 |
| Total | | 100.00 | 100.00 | 99.78 | 102.71 |

The comparative examples CE-3 and CE-4 were prepared following the same procedure as Examples 17-18 but using different matting agents. However, it is found that CE-3 and CE-4 formulations are usable only up to a few hours after dispersion of matting agents (3-5 hrs.). Beyond that time matting agents starts to settle down from the coating forming formulation. The settled particles do not re-disperse completely in the comparative example compositions even after vigorous mixing, and the comparative coating formulations cannot be re-used. Table 14 summarizes the test results of the coating prepared from a fresh coating solution CE-3 and CE-4 (dispersed matting agent and then applied the coating on Bulk Al surface immediately).

The comparative example CE-5 was prepared following the same procedure as Ex. 2. CE-6 was prepared following the procedure as working example Ex. 10.

Test results for the comparative examples are shown in Table 14.

TABLE 14

| Test Results | CE-3 | CE-4 | CE-5 | CE-6 |
|---|---|---|---|---|
| Coating Appearance | Passes | Passes | Fail | Fail |
| Gloss Values (20°) | 170-180 | 170-180 | 580-600 | 580-600 |
| Gloss Values (60°) | 190-210 | 190-200 | 700-750 | 700-750 |
| Gloss Values (85°) | 80-90 | 80-90 | 50-60 | 50-60 |
| Initial Adhesion | 5B | 5B | 5B | 5B |
| Crockmeter Abrasion Resistance test | Fail | Fail | Pass | Pass |

The comparative example CE-3 and CE-4 meet some of the performance requirements but fails in crockmeter abrasion test. The comparative example CE-5 and CE-6 has no matting agent and hence behaves like a clear coat. The gloss values are similar to the uncoated surface and meets other basic coating CTQs.

From Table 12, the preliminary results shows Ex. 17 is the best performing coating compositions. Table 15 shows the comparative test results for uncoated anodized Al, uncoated bulk Al and coated bulk Al (EX. 13).

TABLE 15

| Tests | Anodized Aluminium (Uncoated) | Bulkaluminum (Uncoated) | Ex-17 (Coated Bulk Aluminium) |
|---|---|---|---|
| Gloss values @ 20° | 170-180 | 600-620 | 170-180 |
| Gloss values @ 60° | 200-210 | 680-800 | 160-170 |
| Gloss values @ 85° | 80-90 | 50-60 | 75-85 |
| Adhesion | NA | NA | 5B |
| Abrasion Resistance | Pass | Fails | Pass |
| Acid Resistance | Pass | Pass | Pass |
| Alkaline Resistance | Fail | Fail | Pass |
| Heat Resistance | Fail | Pass | Pass |

While the invention has been described above with references to specific embodiments thereof, many changes, modifications and variations can be made without departing from the inventive concept disclosed herein. Accordingly, it is intended to embrace all such changes, modifications and variations that fall within the spirit and broad scope of the appended claims.

The invention claimed is:

1. A coating forming composition comprising:
   (i) at least one alkoxysilane
   (ii) a plurality of metal oxides, the metal oxides selected from at least one each of (a) alumina, (b) zirconia, and (c) silica, the silica having an average particle size of from about 5 to about 150 nm; the total amount of metal oxide (a), (b), and (c) is from about 1 to about 50 weight percent of the coating forming composition;
   (iii) at least one water miscible organic solvent;
   (iv) at least one acid hydrolysis catalyst;
   (v) water;
   (vi) optionally a matting agent; and
   (vii) at least one condensation catalyst selected from the group consisting of tetrabutylammonium carboxylates of the formula $[(C_4H_9)_4N]^+[OC(O)—R^7]^-$ in which $R^7$ is selected from the group consisting of hydrogen, alkyl groups containing from 1 to about 8 carbon atoms, and aromatic groups containing about 6 to about 20 carbon atoms.

2. The coating forming composition of claim 1, wherein the at least one alkoxy silane is selected from the group consisting of Formula A, Formula B, or a mixture of Formula A and Formula B:

$(X—R^1)_a Si(R^2)_b(OR^3)_{4-(a+b)}$     Formula A

$(R^3O)_3Si—R^5—Si(OR^3)_3$     Formula B or hydrolyzed and condensed products thereof, wherein:
   X is an organofunctional group;
   each $R^1$ is a linear, branched or cyclic divalent organic group of from 1 to about 12 carbon atoms optionally containing one or more heteroatoms;
   each $R^2$ independently is an alkyl, aryl, alkaryl or aralkyl group of from 1 to about 16 carbon atoms, optionally containing one or more halogen atoms;
   each $R^3$ independently is an alkyl group of from 1 to about 12 carbon atoms;
   $R^5$ is a linear, branched or cyclic divalent organic group of from 1 to about 12 carbon atoms optionally containing one or more heteroatoms; and
   subscript a is 0 or 1, subscript b is 0, 1 or 2 and a+b is 0, 1 or 2.

3. The coating forming composition of claim 2, wherein the total amount of alkoxysilane of Formulas A and B does not exceed about 80 weight percent of the coating forming composition.

4. The coating forming composition according to claim 2, wherein in the alkoxysilane of Formula A, a is 1 and organofunctional group X is a mercapto, acyloxy, glycidoxy, epoxy, epoxycyclohexyl, epoxycyclohexylethyl, hydroxy, episulfide, acrylate, methacrylate, ureido, thioureido, vinyl, allyl, —NHCOOR$^4$ or —NHCOSR$^4$ group in which R$^4$ is a monovalent hydrocarbyl group containing from 1 to about 12 carbon atoms thiocarbamate, dithiocarbamate, ether, thioether, disulfide, trisulfide, tetrasulfide, pentasulfide, hexasulfide, polysulfide, xanthate, trithiocarbonate, dithiocarbonate or isocyanurato group, or another —Si(OR$^3$) group wherein R$^3$ is as previously defined.

5. The coating forming composition according to claim 2, wherein in the alkoxysilane of formula B, R$^5$ is a divalent hydrocarbon group containing at least one heteroatom selected from the group consisting of O, S, and NR$^6$ in which R$^6$ is hydrogen or an alkyl group of from 1 to about 4 carbon atoms.

6. The coating forming composition according to claim 2, wherein the trialkoxysilane of Formula A is at least one member selected from the group consisting of methyltrimethoxysilane, methyltriethoxysilane, ethyltrimethoxysilane, ethyltriethoxysilane, ethyltripropoxysilane, n-propyltrimethoxysilane, n-propyltriethoxysilane, n-propyltripropoxysilane, n-propyltributoxysilane, n-butyltrimethoxysilane, isobutyltrimethoxysilane, n-pentyltrimethoxysilane, n-hexyltrimethoxysilane, isooctyltriethoxysilane, vinyltrimethoxysilane, vinyltriethoxysilane, phenyltrimethoxysilane, phenyltriethoxysilane, octyltrimethoxysilane, trifluoropropyltrimethoxysilane, 3-aminopropyltrimethoxysilane, 3-mercaptopropyltrimethoxysilane, 3-mercaptopropyltriethoxysilane, 3-glycidoxypropyltrimethoxysilane and 3-glycidoxypropyltriethoxysilane, and wherein the trialkoxysilane of Formula B is at least one member selected from the group consisting of 1,2-bis(trimethoxysilyl)ethane, 1,2-bis(triethoxysilyl)ethane, bis(trimethoxysilylpropyl)disulfide, bis(triethoxysilylpropyl)disulfide, bix(trimethoxysilylpropyl)tetrasulfide, bis(triethoxysilylpropyl)tetrasulfide, bis(3-triethoxysilylpropyl)amine and bis(3-trimethoxysilylpropyl)amine.

7. The coating forming composition of claim 1, wherein the total amount of metal oxide (a), (b), and (c) is from about 10 to about 40 weight percent based on the weight of the composition.

8. The coating forming composition of claim 1, wherein the weight ratio of alumina to zirconia is from about 9:1 to about 1:9.

9. The coating forming composition of claim 1, wherein the weight ratio of metal oxide (c) to the sum of the alumina and zirconia is from about 99:1 to about 1:99.

10. The coating forming composition of claim 1, wherein alumina is present in an amount of from about 0.1 to about 20 weight percent based on the weight of the composition.

11. The coating forming composition of claim 1, wherein zirconia is present in an amount of from about 0.1 to about 20 weight percent based on the weight of the composition.

12. The coating forming composition of claim 1, wherein the silica is selected from colloidal silica and is present in an amount of about 5 to about 30 weight percent based on the weight of the composition.

13. The coating forming composition of claim 1, wherein the composition includes the water-miscible organic solvent.

14. The coating forming composition of claim 1, wherein the water-miscible organic solvent is at least one member selected from the group consisting of alcohol, glycol, glycol ether and ketone.

15. The coating forming composition of claim 1, wherein the at least one acid hydrolysis catalyst is at least one member selected from the group consisting of sulfuric acid, hydrochloric acid, acetic acid, propanoic acid, 2-methyl propanoic acid, butanoic acid, pentanoic acid (valeric acid), hexanoic acid (caproic acid), 2-ethylhexanoic acid, heptanoic acid (enanthic acid), hexanoic acid, octanoic acid (caprylic acid), oleic acid, linoleic acid, cyclohexanecarboxylic acid, cyclohexylacetic acid, cyclohexenecarboxylic acid, benzoic acid, benzeneacetic acid, propanedioic acid (malonic acid), butanedioic acid (succinic acid), hexanedioic acid (adipic acid), 2-butenedioic acid (maleic acid), lauric acid, stearic acid, myristic acid, palmitic acid, isoanoic acid, versatic acid, and amino acid.

16. The coating forming composition of claim 1, wherein the coating forming composition includes the matting agent.

17. The coating forming composition of claim 16, wherein the matting agent is an inorganic compound or an organic compound.

18. The coating forming composition of claim 16, wherein the matting agent is chosen from silicon dioxide, calcined calcium silicate, hydrated calcium silicate, aluminum silicate, magnesium silicate, titanium oxide, zinc oxide, aluminum oxide, barium oxide, zirconium oxide, strontium oxide, antimony oxide, tin oxide, antimony-doped tin oxide, calcium carbonate, talc, clay, calcined kaolin, calcium phosphate, a silicone resin, a fluororesin, an acrylic resin, or a mixture of two or more thereof.

19. The coating forming composition of claim 16, wherein the matting agent is silica functionalized with a halosilane, an alkoxysilane, a silazane, a siloxane, or a combination of two or more thereof.

20. The coating forming composition of claim 16, wherein the matting agent is present in an amount of from about 0.1 to about 10 weight percent based on the weigh of the composition.

21. The coating forming composition of claim 1, wherein the coating forming composition includes the at least one condensation catalyst (vi).

22. The coating forming composition of claim 1, wherein the at least one condensation catalyst is at least one member selected from the group consisting of tetra-n-butylammonium acetate, tetra-n-butyl ammonium formate, tetra-n-butylammonium benzoate, tetra-n-butylammonium-2-ethylhexanoate, tetra-n-butylammonium-p-ethylbenzoate, tetra-n-butylammonium propionate and TBD-acetate (1,5,7-triazabicyclo[4.4.0]dec-5-ene (TBD)).

23. The coating forming composition of claim 1, having a viscosity within the range of from about 3.0 to about 7.0 cStks at 25° C.

24. An article comprising a coating formed from the coating forming composition of claim 1 disposed on a surface of the article.

25. The article of claim 24, wherein the coated surface is formed from a metal, metal alloy, metallized part, metal or metallized part possessing one or more protective layers, metallized plastic, metal sputtered plastic, or primed plastic material.

26. The article of claim 24, wherein the coated surface comprises a metal chosen from steel, stainless steel, aluminum, anodized aluminum, magnesium, copper, bronze, chromium, or an alloy of two or more of these metals.

27. A method of forming a coating on a surface of an article comprising:
applying the coating forming composition of claim 1 on a surface of the article; and
curing the coating forming composition.

28. The method of claim 27, wherein curing the coating forming composition comprises curing at a temperature of about 80 to about 200° C.

29. A method of forming the coating forming composition according to claim 1 comprising:
a) adding at least one acid hydrolysis catalyst to alkoxysilane;
b) adding the metal oxides (a), (b), and (c), and water to the mixture of step (a);
c) adding at least one water-miscible solvent and additional acid hydrolysis catalyst to the mixture resulting from step (b);
d) aging the mixture resulting from step (c) under conditions of elevated temperature and for a period of time effective to provide a curable coating forming composition having a viscosity within the range of from about 3.0 to about 7.0 cStks at 25° C.; and,
e) adding at least one condensation catalyst at, during, or following any of the preceding steps, wherein the at least one condensation catalyst selected from the group consisting of tetrabutylammonium carboxylates of the formula $[(C_4H_9)_4N]^+[OC(O)-R^7]^-$ in which $R^7$ is selected from the group consisting of hydrogen, alkyl groups containing from 1 to about 8 carbon atoms, and aromatic groups containing about 6 to about 20 carbon atoms.

30. The method of claim 29 comprising adding the matting agent to the composition.

31. The coating forming composition of claim 1 further comprising a metal oxide selected from titania, zinc oxide, ceria, or a combination of two or more thereof.

* * * * *